US012766876B2

(12) United States Patent
Baijens

(10) Patent No.: US 12,766,876 B2
(45) Date of Patent: Oct. 20, 2026

(54) CYCLE HUB ASSEMBLY

(71) Applicant: KUBUS CORPORATE HOLDING B.V., Eindhoven (NL)

(72) Inventor: Coen Antonius Adrianus Maria Baijens, Alphen (NL)

(73) Assignee: KUBUS CORPORATE HOLDING B.V., Eindhoven (NL)

( * ) Notice: Subject to any disclaimer, the term of this patent is extended or adjusted under 35 U.S.C. 154(b) by 512 days.

(21) Appl. No.: 18/274,282

(22) PCT Filed: Jan. 27, 2022

(86) PCT No.: PCT/EP2022/051935

§ 371 (c)(1),
(2) Date: Jul. 26, 2023

(87) PCT Pub. No.: WO2022/162084

PCT Pub. Date: Aug. 4, 2022

(65) Prior Publication Data

US 2024/0308267 A1 Sep. 19, 2024

(30) Foreign Application Priority Data

Jan. 27, 2021 (NL) .................................... 2027447

(51) Int. Cl.
*B60B 1/04* (2006.01)
*B33Y 80/00* (2015.01)
*B60B 1/02* (2006.01)

(52) U.S. Cl.
CPC .............. *B60B 1/042* (2013.01); *B33Y 80/00* (2014.12); *B60B 1/0215* (2013.01); *B60B 1/041* (2013.01); *B60B 2310/20* (2013.01); *B60B 2360/104* (2013.01); *B60B 2360/106* (2013.01); *B60B 2360/32* (2013.01)

(58) Field of Classification Search
CPC ........... B60B 1/04; B60B 1/041; B60B 1/042; B60B 1/0215; B33Y 80/00
See application file for complete search history.

(56) References Cited

U.S. PATENT DOCUMENTS

2006/0197370 A1 9/2006 Mercat et al.
2007/0090686 A1 4/2007 Okajima et al.
(Continued)

FOREIGN PATENT DOCUMENTS

EP 2199636 A1 * 6/2010 ........... B60B 27/023
FR 2640203 A1 * 6/1990 ............. B60B 1/023
(Continued)

*Primary Examiner* — S. Joseph Morano
*Assistant Examiner* — Alex Palmer
(74) *Attorney, Agent, or Firm* — The Webb Law Firm

(57) ABSTRACT

The invention relates to a cycle hub assembly and a method of producing such cycle hub assembly. The cycle hub assembly includes a wheel hub and a plurality of spoke mounting elements. The spoke mounting elements are present in two axially spaced rows positioned around the circumference of the wheel hub. Each spoke mounting element includes at least one spoke mounting hole for receiving at least part of at least one spoke. At least two adjacent spoke mounting elements are interconnected in an efficient manner such that an optimal design of the cycle hub assembly is obtained.

20 Claims, 4 Drawing Sheets

(56) References Cited

U.S. PATENT DOCUMENTS

| | | | | |
|---|---|---|---|---|
| 2013/0207448 | A1* | 8/2013 | Koshiyama | B60B 1/042 301/59 |
| 2014/0175859 | A1 | 6/2014 | Koshiyama | |
| 2019/0291506 | A1 | 9/2019 | Chang | |
| 2022/0220589 | A1* | 7/2022 | Pun | C22C 21/08 |
| 2023/0339263 | A1* | 10/2023 | Jenny | B60B 27/0031 |

FOREIGN PATENT DOCUMENTS

| | | | | |
|---|---|---|---|---|
| FR | 2882689 | A1 | 9/2006 | |
| WO | WO-2007075735 | A2 * | 7/2007 | B60B 1/042 |

* cited by examiner

CYCLE HUB ASSEMBLY

CROSS-REFERENCE TO RELATED APPLICATIONS

This application is the United States national phase of International Application No. PCT/EP2022/051935 filed Jan. 27, 2022, and claims priority to The Netherlands Patent Application No. 2027447 filed Jan. 27, 2021, the disclosures of which are hereby incorporated by reference in their entireties.

BACKGROUND OF THE INVENTION

Field of the Invention

The invention relates to a cycle hub assembly. The invention in particular relates to a cycle hub assembly comprising a wheel hub provided with spoke mounting elements present in two rows spaced axially apart (evenly) around the circumference of the wheel hub, each spoke mounting element having at least one spoke mounting hole into which a wheel spoke having one end can be inserted, the centre lines of the spoke mounting holes preferably extending in a direction perpendicular or substantially perpendicular to the axial direction of the wheel hub. The invention further relates to a ring shaped spoke mounting body for use in a cycle hub assembly according to the present invention. The invention also relates to a method of manufacturing at least one cycle hub assembly according to the present invention.

DESCRIPTION OF THE INVENTION

A cycle hub assembly as described herein is generally known. In the known cycle hub assemblies, the spoke mounting elements are typically oversized due to limitations of the applicable production methods resulting in the spoke mounting elements typically being relatively heavy. A cycle hub assembly according to the prior art is for example described in US 2019/0291506 A1 wherein a wheel hub includes pulling spokes and static spokes connected to the disks thereof.

SUMMARY OF THE INVENTION

It is an object of the present invention to provide an improved cycle hub assembly which is lighter than the cycle hub assemblies according to the prior art or at least to provide an alternative to the known cycle hub assemblies. Another object of the invention is to provide a cycle hub, in particular as described herein, which by means of topology optimization, has the lowest possible mass at a required strength.

The invention provides thereto a cycle hub assembly which is at least partially designed via topology optimization. The invention related to a cycle hub assembly comprising at least one wheel hub, and a plurality of spoke mounting elements, wherein the spoke mounting elements are present in two axially spaced rows positioned around the circumference of the wheel hub, wherein each spoke mounting element comprises at least one spoke mounting hole for receiving at least part of at least one spoke, and preferably wherein at least two adjacent spoke mounting elements are interconnected via at least one bridge piece, wherein at least part of said bridge piece has a width which is smaller than a width of at least one spoke mounting element connected with said bridge piece. It can also be said that an embodiment of the cycle hub assembly according to the invention is characterized in that the spoke mounting elements are interconnected by means of bridge pieces which have, at least in part, a width which is smaller than the width of the spoke mounting elements. In particular, the spoke mounting elements can support each other via the bridge pieces, so that they can take the forces that the spokes exert on the spoke mounting elements, without the spoke mounting elements having to be of a solid, and thus heavy, configuration for this purpose. It can also be said that the spoke mounting elements can be supported by the bridge pieces in order to withstand the forces exerted by the spokes on the spoke mounting elements.

The cycle hub assembly according to the present invention benefits of being optimally designed such that a beneficial force distribution is obtained. Hence, the cycle hub assembly according to the present invention can be configured such that the assembly, and in particular the configuration of the spoke mounting elements and bridge pieces has the lowest possible mass at a required strength.

When it is referred to a bridge piece, also a bridge part, bridge element and/or bridge member can be meant. The spoke mounting element(s), and in particular the spoke mounting hole(s) thereof, define a receiving space for receiving part of a spoke. The invention is configured to be used in combination with any conventional spoke for use in a (bi)cycle. In particular, the internal design of the spoke mounting element or spoke mounting hole can be designed to fit a specific type of spoke. When it is said that at least part of a bridge piece has a width which is smaller than a width of at least one spoke mounting element connected with said bridge piece, it is meant that at least part of the bridge piece has a relatively small and/or narrow configuration. When it is referred to a width of the bridge piece, the smallest width of said bridge piece can be meant. The smallest width of the bridge piece, typically present in a central part of said bridge piece, hence is typically smaller than the widest width of the spoke mounting element connected with said bridge piece. It is also conceivable that the smallest width of the bridge piece is even smaller than the smallest width of the spoke mounting element connected with said bridge piece. The width is in particular an outer dimension. The wheel hub can be any type of conventional wheel hub. The wheel hub can for example be a substantially elongated, hollow wheel hub. The spoke mounting elements and/or bridge pieces are preferably located at the distal ends of the wheel hub.

In a possible embodiment, the cycle hub assembly comprises a plurality of bridge pieces, wherein the spoke mounting elements of at least one row, and preferably of each row are interconnected via bridge pieces which at least partially have a width which is smaller than the width of at least one spoke mounting element connected with said bridge piece. In this way, an efficient orientation of spoke mounting elements and bridge pieces is obtained. It is also conceivable that multiple spoke mounting elements are interconnected via the same bridge piece. It is for example possible that at least three spoke mounting elements are interconnected via the same bridge piece. It is also imaginable that at least two pairs of spoke mounting elements, or at least two bundles of spoke mounting elements, are mutually (inter)connected via at least one bridge piece.

It is beneficial if at least one spoke mounting element is supported by at least one bridge piece. It is also conceivable that multiple spoke mounting elements are supported by at least one bridge piece. Multiple spoke mounting elements, for example multiple adjacent spoke mounting element, can be supported by the same bridge piece. It is possible that at least one bridge piece is attached to at least one spoke mounting element under the spoke mounting hole of said spoke mounting element. An embodiment of the cycle hub assembly according to the invention is also conceivable wherein the bridge pieces are attached to the spoke mounting elements below the spoke mounting holes in order to properly transmit the forces exerted by the spokes.

An embodiment of the cycle hub assembly is conceivable wherein at least part of the spoke mounting elements and bridge pieces, in particular at least part of the spoke mounting elements and bridge pieces of at least one row, are integrally connected. In such configuration the co-action between the spoke mounting elements and the bridge pieces can be further optimized. It is also conceivable that all spoke mounting elements and all bridges pieces of at least one row, and preferably of each row, are integrally connected. At least one row, and preferably each row, comprised of spoke mounting element and bridge pieces can be formed in a one piece configuration. Integral connection(s) between the spoke mounting elements and the bridge pieces can further contribute to the strength of the cycle hub assembly. A further embodiment is imaginable wherein at least part of the spoke mounting elements and/or at least part of the bridges pieces of at least one row, and preferably of each row, are integrally connected with the wheel hub. Hence, it is also conceivable that the spoke mounting elements, the bridges pieces and the wheel hub are made of a single piece.

In a preferred embodiment of the cycle hub assembly according to the present invention, at least part of the spoke mounting elements and/or at least part of the bridges pieces is manufactured via 3D printing. More preferably, all spoke mounting elements and all bridges pieces are manufactured via 3D printing. By using a 3D printing technique, the design of the spoke mounting elements and bridge pieces can be executed in detail. It is also possible that at least part of the wheel hub is manufactured via 3D printing.

In a preferred embodiment, at least part of the spoke mounting elements and/or at least part of the bridges pieces is at least partially made of metal. Non-limiting examples of metals which can be applied are aluminium, magnesium, scandium, titanium and/or combination thereof. At least part of the spoke mounting elements and/or at least part of the bridges pieces can be at least partially made of an alloy, in particular an alloy comprising aluminium, magnesium, and/or scandium. It is also conceivable that an alloy comprising at least one ceramic filler is applied. It is for example conceivable that at least part of the spoke mounting elements and/or at least part of the bridges pieces is made of Scalmalloy. The commercial product Scalmalloy® by APWORKS is a well-known alloy. The same materials can be applied for manufacturing the wheel hub. It is for example possible that the wheel hub is at least partially made of an alloy, in particular an alloy comprising aluminium, magnesium, and/or scandium. It was found that an alloy comprising aluminium, magnesium and/or scandium is a suitable material for 3D printing at least parts of a cycle hub assembly according to the present invention.

It is beneficial to apply a 3D printing technique to manufacture the spoke mounting element and bridge piece(s) as this technique is more convenient for such embodiment than for example a turning and milling technique. 3D printing benefits of the need of less material, which is beneficial from environmental point of view. Also the degree of detail which can be achieved is typically higher for 3D printing.

3D printing further provides the freedom of using different materials, depending on the desired properties of the final product. The use of a 3D printing technique can also be beneficial from economical point of view, as it is typically cheaper than manufacturing by casting. But more imported, alloys, and in particular aluminium alloys, have a much lower specific strength when produced via a casting process. When comparing to 3D printing, in order to achieve the same strength with an aluminium based casting alloy, the cycle hub assembly would become at least twice as heavy.

In yet a further embodiment of the cycle hub assembly according to the present invention, it is also conceivable that at least part of the spoke mounting elements and/or at least part of the bridges pieces are at least partially made of a polymer material. It would in particular be beneficial to apply a reinforced polymer, for example but not limited to a fibre-reinforced polymer. Such polymer can for example be reinforced with fiberglass. Optionally, the wheel hub can also be at least partially made of a polymer material. Any of the materials which are applied for the spoke mounting element and/or the bridge pieces also be applied for the wheel hub. It is also imaginable that the wheel hub and the rows of spoke mounting elements and bridge pieces are made of different materials. The wheel hub could for example also be made of carbon.

In a preferred embodiment, at least part of the centre line of at least one spoke mounting element, and in particular of at least one spoke mounting hole extends in a direction substantially perpendicular to the axial direction of the wheel hub. The centre line of the spoke mounting hole could in a possible embodiment be in line with the longitudinal direction of a spoke which can be received in said spoke mounting hole. However, it is also conceivable that the centre line of the spoke mounting hole extends in a direction which is substantially perpendicular, or under any predetermined angle, with respect to the longitudinal direction of a spoke which can be received in said spoke mounting hole. It is also possible that at least part of the centre line of at least one spoke mounting hole extends in a direction substantially parallel to the radial direction of the wheel hub. Basically, the cycle hub assembly according to the present invention can be applied for any type of spokes of cycles. Hence, the spoke mounting elements can be configured to co-act with straight-pull spokes but also with J-bend spokes. The orientation of the spoke mounting elements, and in particular of the spoke mounting holes, can be determined based upon the preferred type of spokes to be applied.

The configuration of at least part of the bridge pieces, and preferably of all bridge pieces, is in particular designed via topology optimization. The invention also related to a cycle hub assembly comprising a wheel hub, and a plurality of spoke mounting elements, wherein the spoke mounting elements are present in two axially spaced rows positioned around the circumference of the wheel hub, wherein each spoke mounting element comprises at least one spoke mounting hole for receiving at least part of at least one spoke, wherein at least two adjacent spoke mounting elements are interconnected via at least one bridge piece, wherein at least part of said bridge piece is designed via topology optimization. Preferably, each row of spoke mounting elements is designed via topology optimization. Topology optimization can positively contribute to maximizing the efficiency of the design of at least the bridge parts and/or the spoke mounting elements and thus contribute to enhancing the performance of the cycle hub assembly. The topology optimization is preferably directed to reduce the required material by defining an embodiment wherein material is only present where needed, in particular in the line(s) of force.

In a possible embodiment, at least part of at least one bridge piece, and preferably of all bridge pieces is positioned at a distance above the wheel hub. It is for example conceivable that there is at least one accommodating space between at least part of an outer surface of the wheel hub and at least one bridge piece. Such embodiment allows the bridge pieces to be manufactured in an efficient configuration, which may also contribute to a material reduction as material should only be present where needed (in the lines of force).

It is imaginable that at least part of the bridge pieces are substantially identical. It is also imaginable that substantially all bridge pieces are substantially identical. Such consistency in shape may further contribute to an optimal distribution of forces. Hence, it is also imaginable that substantially all spoke mounting element are substantially identical. It is for example possible that at least one bridge piece, has a curved orientation. It is also possible that at least one bridge piece has at least partially an hourglass shape, in particular a substantially bended hourglass shape. It is preferred that at least part of a centre part of at least one bridge piece is free of any load. Hence, preferable the spoke mounting elements are connected to the distal ends of a bridge piece.

At least one spoke mounting element, and preferably each spoke mounting element, can be at least partially bowl shaped. A bowl shape is beneficial as such configuration may provide an efficient design to attach a spoke within said spoke mounting element. The bowl shape can provide a protective function for at least part of a spoke which is connected to said spoke mounting element.

The cycle hub assembly preferably has a substantially uniform or at least repeated pattern. This is beneficial for the stability of the cycle hub assembly, in particular during use. It is conceivable that at least one row, and preferably each row comprises N spoke mounting elements and wherein at least one row, and preferably each row comprises a plurality of bridge pieces, wherein the number of bridge pieces is at least 0.5N. In a possible embodiment, the cycle hub assembly comprises an equal number of spoke mounting element and bridge pieces. However, the preferred number of spoke mounting elements and bridge pieces can be chosen based upon the desired final characteristics of the cycle hub assembly, for example via topology optimization.

It is also conceivable that at least one spoke mounting element comprises at least two spoke mounting holes, wherein each spoke mounting hole is configured for receiving at least part of at least one spoke. Such embodiment is efficient from spatial point of view, as less material can be used to facilitate fixation of the spokes. It is for example conceivable that at least one spoke mounting element comprises at least two receiving spaces which are oriented in opposite directions, wherein each receiving space is provided with at least one spoke mounting hole. Possibly, at least one receiving space is substantially bowl-shaped. It is also possible that at least one, and preferably each spoke mounting element comprises at least two bowl-shaped receiving spaces which are oriented in opposite directions, wherein the spoke mounting holes are preferably present in a lower part of the receiving spaces. As a result, in a mounted condition, the spokes exert opposing forces on the spoke mounting elements so that (in the unloaded state of the wheel) they need to withstand only minor forces.

At least part of the spoke mounting elements are typically attached to the wheel hub. At least part of the spoke mounting elements can for example be attached to the circumference of the wheel hub in an axially spaced row. It is also conceivable that at least part of the bridge pieces is directly attached to the wheel hub. When it is referred to an axially spaced row, also a ring can be meant.

The cycle hub assembly according to the present invention could also comprise two ring-shaped spoke mounting bodies, wherein each spoke assembly body is formed by a row of spoke mounting elements, wherein at least two adjacent spoke mounting elements are interconnected via at least one bridge piece, wherein at least part of said bridge piece has a width which is smaller than a width of at least one spoke mounting element connected with said bridge piece. The invention also relates to a ring shaped spoke mounting body for use in a cycle hub assembly according to the present invention, wherein at least two adjacent spoke mounting elements are interconnected via at least one bridge piece, wherein at least part of said bridge piece has a width which is smaller than a width of at least one spoke mounting element connected with said bridge piece.

The invention also relates to method of manufacturing at least one ring shaped spoke mounting body for use in a cycle hub assembly according to the present invention, wherein at least two adjacent spoke mounting elements are interconnected via at least one bridge piece, wherein at least part of said bridge piece has a width which is smaller than a width of at least one spoke mounting element connected with said bridge piece, in particular via 3D printing.

The invention further relates to a method of manufacturing at least one cycle hub assembly, in particular according to any of the embodiments described within the scope of the present invention, the method comprising the steps of providing at least one wheel hub, and providing a plurality of spoke mounting elements, wherein the spoke mounting elements are present in two axially spaced rows positioned around the circumference of the wheel hub, wherein each spoke mounting element comprises at least one spoke mounting hole for receiving at least part of at least one spoke, and wherein at least two adjacent spoke mounting elements are interconnected via at least one bridge piece, wherein preferably at least part of said bridge piece has a width which is smaller than a width of at least one spoke mounting element connected with said bridge piece. The spoke mounting elements, bridge pieces and wheel hub can be configured according to any of the described preferred embodiments in configuration and materials. It is beneficial if at least part of the spoke mounting elements and/or at least part of the bridges pieces are manufactured via 3D printing. It would also be beneficial if at least part of the wheel hub is manufactured via 3D printing.

The invention will be further elucidated based upon the following non-limitative clauses.

1. Cycle hub assembly comprising a wheel hub provided with spoke mounting elements present in two axially spaced rows evenly spaced around the circumference of the wheel hub, each spoke mounting element being provided with at least one spoke mounting hole into which a wheel spoke with one end can be inserted, the centre lines of the spoke mounting holes extending in a direction perpendicular or nearly perpendicular to the axial direction of the wheel hub, characterized in that the spoke mounting elements are interconnected by bridge pieces which have, at least in part, a width smaller than the width of the spoke mounting elements.

2. Cycle hub assembly according to clause 1, characterized in that the bridge pieces are attached to the spoke mounting elements under the spoke mounting holes.
3. Cycle hub assembly according to clause 1 or 2, characterized in that the bridge pieces are present at a distance above the wheel hub.
4. Cycle hub assembly according to clause 1, 2 or 3, characterized in that the spoke mounting elements and the bridge pieces are manufactured by a 3D printing technique using Scalmalloy® as the 3D printing material.
5. Cycle hub assembly according to one of the previous clauses, characterized in that each spoke mounting element comprises two bowl-shaped recesses oriented in opposite directions, the spoke mounting holes being present in the bottoms of the recesses.

BRIEF DESCRIPTION OF THE DRAWINGS

The terms FIG., FIGS., Figure, and Figures are used interchangeably in the specification to refer to the corresponding figures in the drawings.

The invention will be further elucidated by means of non-limiting exemplary embodiments illustrated in the following figures. Herein, shows.

Within these figures, similar reference numbers correspond to similar or equivalent elements or features.

DESCRIPTION OF THE INVENTION

Figure 1:
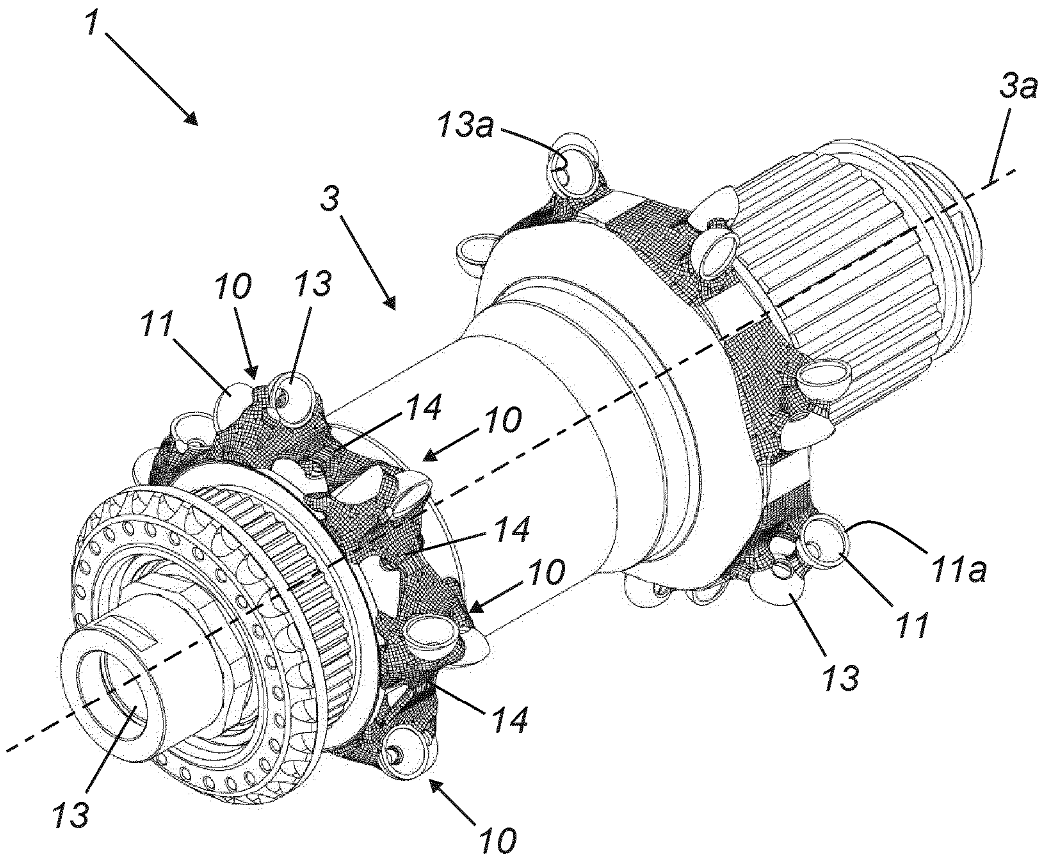
FIG. 1 a perspective view of a first embodiment of a cycle hub assembly according to the present invention.
Figure 2:
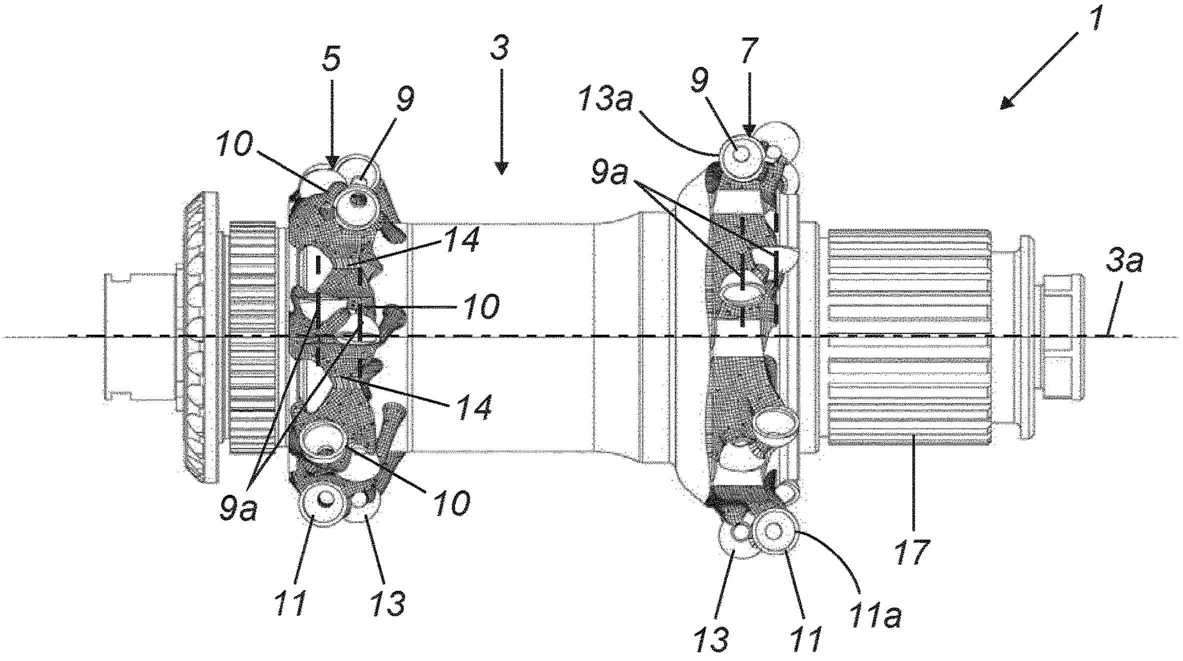
FIG. 2 a side view of the cycle hub assembly as shown in FIG. 1.

FIGS. 1 and 2 show a first embodiment of the cycle hub assembly for a bicycle according to the present invention in perspective and (longitudinal) side view, respectively. The cycle hub assembly 1 comprises a wheel hub 3, in particular an elongated, hollow wheel hub 3 through which a wheel axle of a cycle, such as a bicycle, can be inserted. On the wheel hub 3 there are two ring-shaped spoke mounting bodies 5 and 7, or rows, which can for example be manufactured using a 3D printing technique. These spoke mounting bodies 5 and 7 are spaced apart and are provided with spoke mounting elements 10. The spoke mounting elements 10 in the shown embodiment are present in two axially spaced rows and are evenly distributed around the circumference of the wheel hub 3. In the shown embodiment, each spoke mounting element 10 is provided with two spoke mounting holes 9 into which spokes, such as straight-pull spokes, can be inserted. The centre lines 9*a* of the spoke mounting holes 9 extend in a direction perpendicular or nearly perpendicular to the axial direction 3*a* of the wheel hub 3, this axial direction being parallel to the centre line 3*a* of the wheel hub 3. This is shown in FIGS. 1 and 2. The centre lines 9*a* of the spoke mounting holes 9 extend almost in the tangential direction of the wheel hub 3. The spoke mounting bodies 5 and 7 are in the shown embodiment provided with spoke mounting bowls 11 and 13. In each spoke mounting bowl 11, 13 one of the said spoke mounting holes 9 is present. These spoke mounting bowls 11, 13 are provided with an edge 11*a*, 13*a* present in a plane parallel to the centre line of the wheel hub 3. At the centre of each spoke mounting bowl 11, 13 one of the spoke mounting holes 9 is present. Within each spoke mounting body 5, 7, the spoke mounting bowls 11, 13 are present in two adjacent rows. The spoke mounting bowls 11 in a first of the adjacent rows are in the shown embodiment oriented opposite to the spoke mounting bowls 13 in the other row. The spoke mounting elements 10 are interconnected via bridge pieces 14 which have, at least in part, a width smaller than the width of the spoke mounting elements 10.

Figure 3:
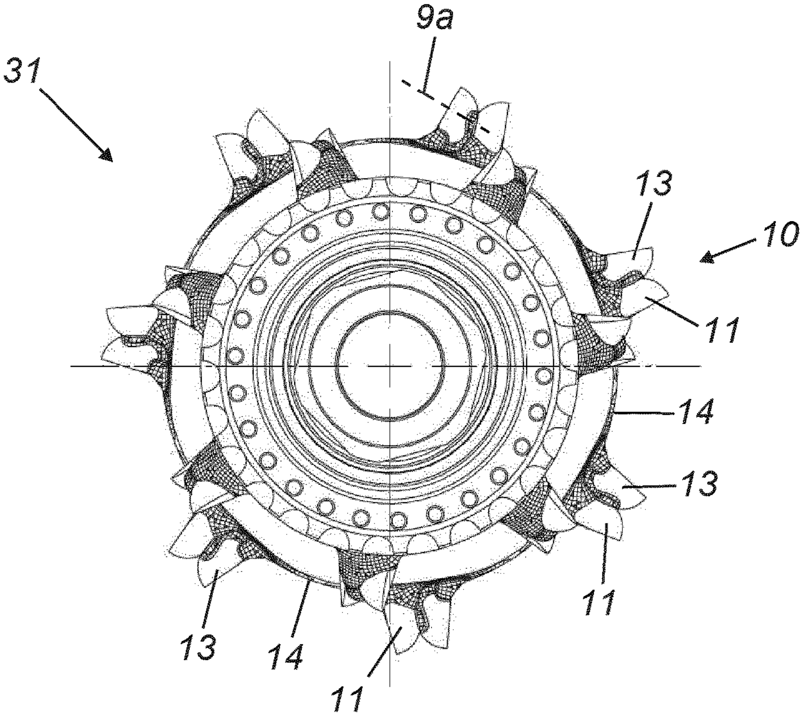
FIG. 3 a front view of a second possible embodiment of the cycle hub assembly according to the present invention.

FIG. 3 shows a front view of a second possible embodiment of a cycle hub assembly 31 according to the present invention. The cycle hub assembly 31 has overlap with the cycle hub assembly 1 as shown in FIGS. 1 and 2. In the shown embodiment, the bearing of the wheel hub differs from the first embodiment. It can be seen that least two adjacent spoke mounting elements 10 are interconnected via at least one bridge piece 14.

Figure 4:
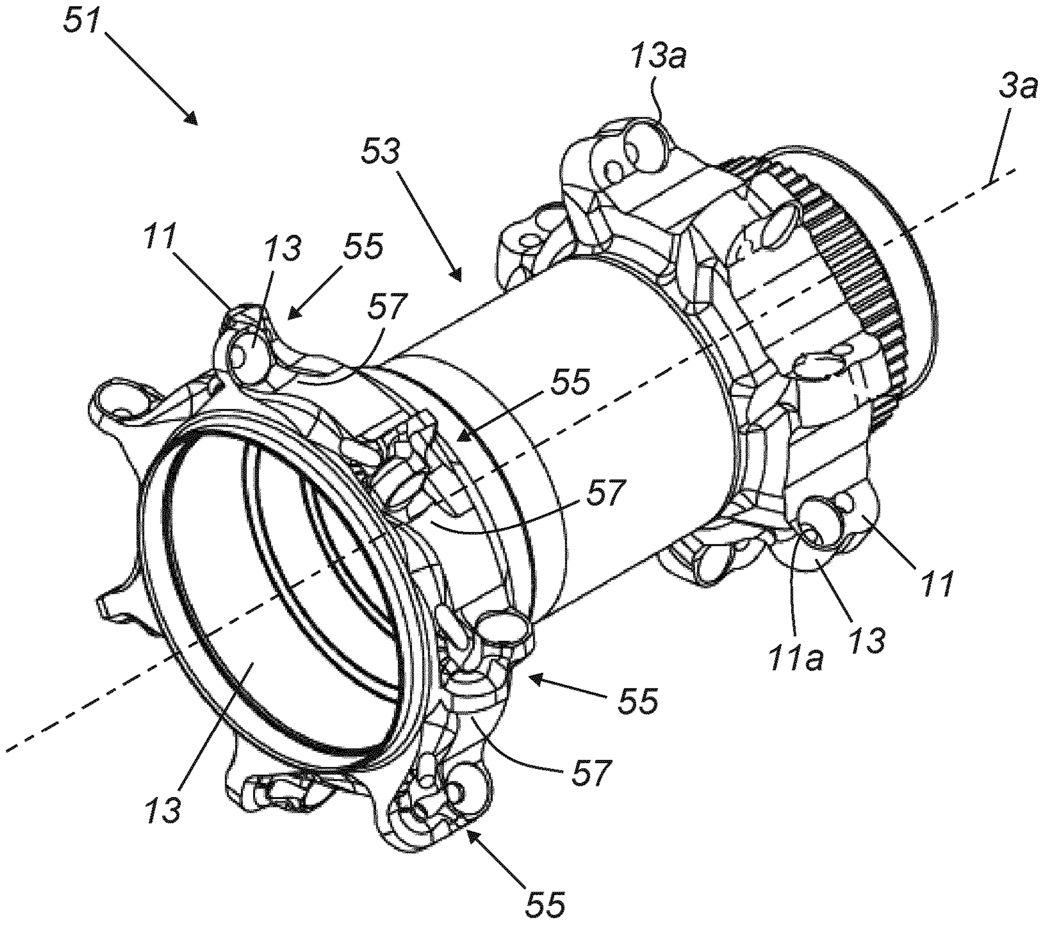
FIG. 4 a perspective view of a third possible embodiment of a cycle hub assembly according to the present invention.
Figure 5:
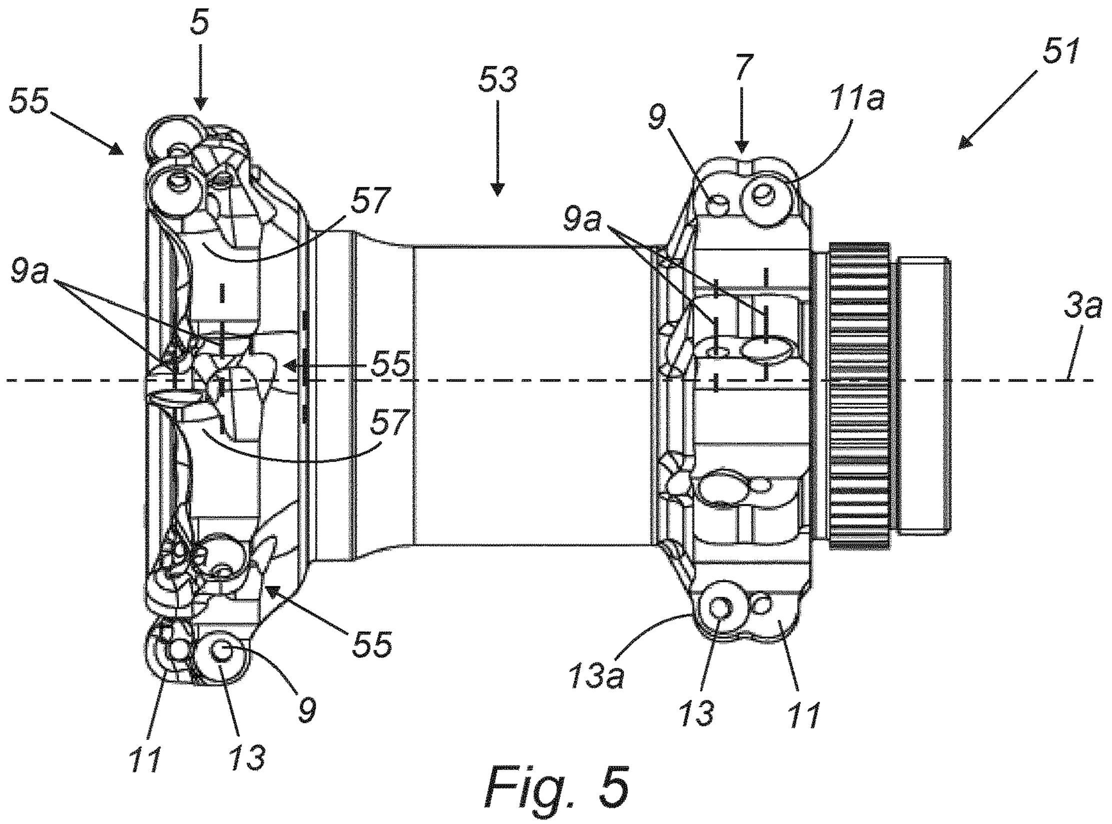
FIG. 5 a side view view of the cycle hub assembly as shown in FIG. 4.
Figure 6:
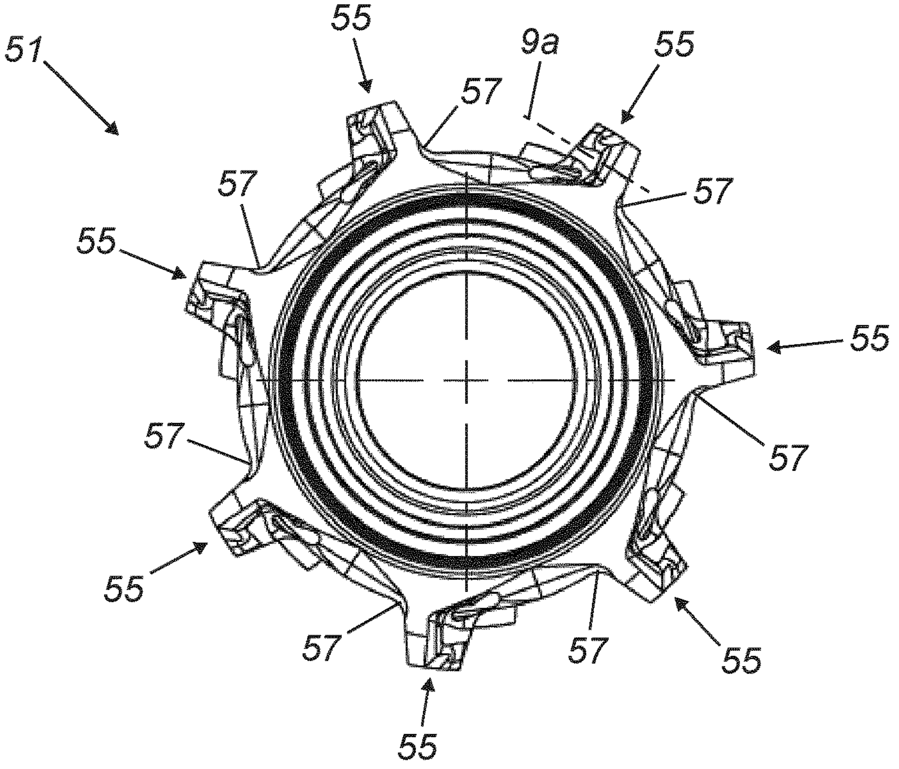
FIG. 6 a front view of the cycle hub assembly as shown in FIGS. 4 and 5.

FIGS. 4, 5 and 6 show a third embodiment of the cycle hub assembly 51 according to the present invention in a perspective view and in side views. In the shown embodiment of the cycle hub assembly 51 comprises a plurality of spoke mounting elements 55 and the bridge pieces 57, wherein at least part of the bridge pieces 57 have a width which is smaller than a width of at least one spoke mounting element 55 connected with said bridge piece 57. The embodiment as shown, could alternatively to being formed by 3D printing, be manufactured via machining methods such as a turning and milling technique. As can be seen in the figures, the bridge pieces 57 are also narrower than the spoke mounting elements 55. In the shown embodiment, the bridge pieces 57 are not located at a distance from the wheel hub 53 but are directly positioned upon the circumference of the body of the wheel hub 53.

It will be clear that the invention is not limited to the exemplary embodiments which are illustrated and described here, but that countless variants are possible within the framework of the attached claims, which will be obvious to the person skilled in the art. In this case, it is conceivable for different inventive concepts and/or technical measures of the above-described variant embodiments to be completely or partly combined without departing from the inventive idea described in the attached claims.

The verb 'comprise' and its conjugations as used in this patent document are understood to mean not only 'comprise', but to also include the expressions 'contain', 'substantially contain', 'formed by' and conjugations thereof.

The invention claimed is:

1. A cycle hub assembly comprising:

a wheel hub; and a plurality of spoke mounting elements;

wherein the spoke mounting elements are present in two axially spaced rows positioned around the circumference of the wheel hub, wherein each spoke mounting element comprises at least one spoke mounting hole for receiving at least part of at least one spoke, and wherein at least two adjacent spoke mounting elements are interconnected via at least one bridge piece, wherein at least part of said bridge piece has a width which is smaller than a width of at least one spoke mounting element connected with said bridge piece, and wherein the at least one bridge piece is attached to the at least two adjacent spoke mounting elements only under the at least one mounting hole of each adjacent spoke mounting element.

2. The cycle hub assembly according to claim 1, comprising a plurality of bridge pieces, wherein the spoke mounting elements of each row are interconnected via bridge pieces which at least partially have a width which is smaller than the width of at least one spoke mounting element connected with said bridge piece.

3. The cycle hub assembly according claim 1, wherein multiple spoke mounting elements are interconnected via the same bridge piece.

4. The cycle hub assembly according to claim 1, wherein at least one spoke mounting element is supported by at least one bridge piece.

5. The cycle hub assembly according to claim 1, wherein at least part of the spoke mounting elements and bridge pieces are integrally connected.

6. The cycle hub assembly according to claim 1, wherein all spoke mounting elements and all bridge pieces of at least one row, are integrally connected.

7. The cycle hub assembly according to claim 1, wherein at least part of the spoke mounting elements and/or at least part of the bridge pieces of at least one row are integrally connected with the wheel hub.

8. The cycle hub assembly according to claim 1, wherein the spoke mounting elements, the bridge pieces and the wheel hub are made of a single piece.

9. The cycle hub assembly according to claim 1, wherein at least part of the spoke mounting elements and/or at least part of the bridge pieces are manufactured via 3D printing and/or wherein at least part of the wheel hub is manufactured via 3D printing.

10. The cycle hub assembly according to claim 1, wherein at least part of the spoke mounting elements and/or at least part of the bridge pieces are at least partially made of an alloy or an alloy comprising aluminium, magnesium, and/or scandium.

11. The cycle hub assembly according to claim 1, wherein the wheel hub is at least partially made of an alloy or an alloy comprising aluminium, magnesium, and/or scandium and/or wherein at least part of the spoke mounting elements and/or at least part of the bridge pieces are at least partially made of a polymer material.

12. The cycle hub assembly according to claim 1, wherein at least part of the centre line of at least one spoke mounting hole extends in a direction substantially perpendicular to the axial direction of the wheel hub and/or, wherein at least part of the centre line of at least one spoke mounting hole extends in a direction substantially parallel to the radial direction of the wheel hub.

13. The cycle hub assembly according to claim 1, wherein the configuration of at least part of the bridge pieces, is designed via topology optimization.

14. The cycle hub assembly according to claim 1, wherein at least one bridge piece is positioned at a distance above the wheel hub and/or, wherein at least part of the bridge pieces are substantially identical.

15. The cycle hub assembly according to claim 1, wherein at least one spoke mounting element is at least partially bowl shaped, and/or wherein at least one row comprises N spoke mounting elements and wherein at least one row, = comprises a plurality of bridge pieces, wherein the number of bridge pieces is at least 0.5N.

16. The cycle hub assembly according to claim 1, wherein at least one spoke mounting element comprises at least two spoke mounting holes, wherein each spoke mounting hole is configured for receiving at least part of at least one spoke.

17. A ring shaped spoke mounting body for use in a cycle hub assembly according to claim 1, wherein at least two adjacent spoke mounting elements are interconnected via at least one bridge piece, wherein at least part of said bridge piece has a width which is smaller than a width of at least one spoke mounting element connected with said bridge piece.

18. A method of manufacturing at least one cycle hub assembly, the method comprising the steps of:

providing a wheel hub; and providing a plurality of spoke mounting elements;

wherein the spoke mounting elements are present in two axially spaced rows positioned around the circumference of the wheel hub, wherein each spoke mounting element comprises at least one spoke mounting hole for receiving at least part of at least one spoke, and wherein at least two adjacent spoke mounting elements are interconnected via at least one bridge piece, wherein at least part of said bridge piece has a width which is smaller than a width of at least one spoke mounting element connected with said bridge piece, and wherein the at least one bridge piece is attached to the at least two adjacent spoke mounting elements only under the at least one spoke mounting hole of each adjacent spoke mounting element.

19. The method according to claim 18, wherein at least part of the spoke mounting elements and/or at least part of the bridge pieces are manufactured via 3D printing and/or, wherein at least part of the wheel hub is manufactured via 3D printing.

20. A cycle hub assembly comprising:

a wheel hub; and a plurality of spoke mounting elements;

wherein the spoke mounting elements are present in two axially spaced rows positioned around the circumference of the wheel hub, wherein each spoke mounting element comprises at least one spoke mounting hole for receiving at least part of at least one spoke, and wherein at least two adjacent spoke mounting elements are interconnected via at least one bridge piece, wherein at least part of said bridge piece has a width which is smaller than a width of at least one spoke mounting element connected with said bridge piece, and wherein at least part of said at least one bridge piece is positioned at a distance above the wheel hub and wherein at least one accommodating space is situated between at least part of an outer surface of the wheel hub and said at least one bridge piece.

* * * * *